United States Patent
Bilek (10) Patent No.: US 12,314,997 B2
(45) Date of Patent: May 27, 2025

(54) SYSTEMS AND METHODS FOR USER INPUT-RESPONSIVE RECOMMENDATIONS FOR ALTERNATIVE ITEMS OR SERVICES

(71) Applicant: Capital One Services, LLC, McLean, VA (US)

(72) Inventor: Baris Bilek, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 337 days.

(21) Appl. No.: 17/932,699

(22) Filed: Sep. 16, 2022

(65) Prior Publication Data

US 2024/0095803 A1    Mar. 21, 2024

(51) Int. Cl.
| | |
|---|---|
| *G06Q 30/00* | (2023.01) |
| *G06F 3/0481* | (2022.01) |
| *G06Q 30/0601* | (2023.01) |
| *G06F 3/04842* | (2022.01) |

(52) U.S. Cl.
CPC ....... *G06Q 30/0631* (2013.01); *G06F 3/0481* (2013.01); *G06Q 30/0643* (2013.01); *G06F 3/04842* (2013.01); *G06F 2203/04803* (2013.01)

(58) Field of Classification Search
CPC .............................................. G06Q 30/06–08
See application file for complete search history.

(56) References Cited

U.S. PATENT DOCUMENTS

| | | | |
|---|---|---|---|
| 8,244,600 B2 * | 8/2012 | Gromek | G06Q 30/0643 705/27.2 |
| 8,620,767 B2 | 12/2013 | Linden et al. | |
| 10,354,312 B2 | 7/2019 | Bhosle et al. | |
| 11,386,159 B2 * | 7/2022 | Kishimoto | G06N 5/04 |
| 2008/0091546 A1 * | 4/2008 | Kirovski | G06Q 30/0629 705/26.64 |
| 2012/0173335 A1 | 7/2012 | Amzallag et al. | |
| 2014/0046794 A1 | 2/2014 | Vallery et al. | |
| 2014/0214590 A1 * | 7/2014 | Argue | G06Q 30/0631 705/26.7 |
| 2015/0088642 A1 | 3/2015 | Mathew | |
| 2015/0100404 A1 * | 4/2015 | Globe | G06Q 30/0631 705/26.7 |

(Continued)

OTHER PUBLICATIONS

"Fry Launches Checkout Redesign for Panasonic Consumer Electronics Site", PR Newswire, Apr. 14, 2009 (Year: 2009).*

*Primary Examiner* — Ethan D Civan
(74) *Attorney, Agent, or Firm* — Bookoff McAndrews, PLLC (57) ABSTRACT

A computer-implemented method for processing items or services in a container may include: initiating execution of a web module or an application installed on a user device based on user input; identifying an alternative for an item or service in the container; providing a user interface including: first information related to the item or the service in a first portion, second information related to alternative in a second portion, and one or more user interface elements overlaying the first portion or the second portion; detecting input to the one or more user interface elements, the input including: a command to cycle through display of the alternative item or service, selection of the alternative item or service, and/or an indication of a preference for the alternative item or service; and performing one or more actions based on the input.

20 Claims, 4 Drawing Sheets

(56) References Cited

U.S. PATENT DOCUMENTS

2015/0220999 A1* 8/2015 Thornton ............ H04M 15/805
                                                    705/14.66
2019/0066175 A1* 2/2019 Godsey .............. G06Q 30/0613

* cited by examiner

SYSTEMS AND METHODS FOR USER INPUT-RESPONSIVE RECOMMENDATIONS FOR ALTERNATIVE ITEMS OR SERVICES

TECHNICAL FIELD

Various embodiments of this disclosure relate generally to machine learning techniques for recommending alternative items or services and, more particularly, to systems and methods for user input-responsive recommendations for alternative items or services.

BACKGROUND

Individuals may use a web browser or an application on a user device to search for and purchase items or services. These activities may consume a significant amount of computing resources and/or time due to the individual having to perform web searches for items and/or services, for possible alternatives to the items and/or services, and/or the like. In addition, individuals often experience buyer's remorse, resulting in the individual returning the items or canceling the services, exchanging or modifying the items or services for less expensive options, and/or the like. This wastes additional time and computing resources, and may also cost the individual a significant amount of money. Furthermore, the purchasing of items and/or services may have impacts in other areas related to the individual, such as a financial account.

Some conventional techniques may use information in a database related to prior purchases of the individual or another individual to recommend other items or services for purchase. However, these techniques often just recommend items or services based on pre-defined rules or based on items or services that were purchased together by other individuals, which may waste computing resources due to determining and providing irrelevant recommendations to the individual. Thus, conventional techniques for searching and/or purchasing items and/or services, including the foregoing, fail to generate recommendations related alternative items and/or services that may be responsive to user input, that may be associated with a user-specific objective, and/or the like.

This disclosure is directed to addressing one or more challenges such as those referenced above. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for user input-responsive recommendations for alternative items and/or services.

In one aspect, a computer-implemented method for processing items or services in a container may include: initiating execution of a web module or an application installed on a user device based on input to the user device; identifying one or more alternative items or services for an item or service in the container; providing a user interface for display via the user device, the user interface comprising: first information related to the item or the service in a first portion of the user interface, second information related to the one or more alternative items or services in a second portion of the user interface, and one or more user interface elements overlaying the first portion or the second portion; detecting input to the one or more user interface elements, the input comprising one or more of: a command to cycle through display of the one or more alternative items or services, a selection of at least one of the one or more alternative items or services, or an indication of a preference for the one or more alternative items or services; and performing one or more actions based on the input.

In another aspect, a user device may include: at least one memory storing instructions; and at least one processor executing the instructions to perform operations for processing items or services in a container. The operations may include: initiating execution of a web module or an application installed on the user device based on first input to the user device; identifying one or more alternative items or services for an item or service in the container; providing a user interface for display via the user device, the user interface comprising: first information related to the item or the service, second information related to the one or more alternative items or services, and one or more user interface elements; detecting second input to the one or more user interface elements, the second input comprising one or more of: a command to cycle through display of the one or more alternative items or services, a selection of at least one of the one or more alternative items or services, or an indication of a preference for the one or more alternative items or services; and performing one or more actions based on the second input.

In a further aspect, a non-transitory computer-readable medium storing instructions that, when executed by a processor, cause the processor to perform a method for processing items or services in a container. The method may include: initiating execution of a web module or an application installed on a user device; identifying one or more alternative items or services for an item or service in the container; providing a user interface for display via the user device, the user interface comprising: first information related to the item or the service in a first portion of the user interface, second information related to the one or more alternative items or services in a second portion of the user interface, and one or more user interface elements overlaying the first portion or the second portion; and detecting input to the one or more user interface elements, the input comprising one or more of: a command to cycle through display of the one or more alternative items or services, a selection of at least one of the one or more alternative items or services, or an indication of a preference for the one or more alternative items or services.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

According to certain aspects of the disclosure, methods and systems are disclosed for user input-responsive recommendations for alternative items and/or services, e.g., to recommend alternative items and/or services that satisfy an objective related to an individual. Conventional techniques may not be suitable for these types of recommendations. For example, conventional techniques may not monitor user shopping behavior and dynamically recommend alternative items and/or services based on user input to a user interface or based on one or more objectives. Accordingly, improvements in technology relating to recommending alternative items and/or services are needed.

As will be discussed in more detail below, in various embodiments, systems and methods are described for using machine learning to recommend alternative items and/or services. By training a machine-learning model, e.g., via supervised or semi-supervised learning, to learn associations between items and/or services in a virtual container and alternative items and/or services selected by a user, the trained machine-learning model may be usable to recommend alternative items and/or services based on user input, one or more objectives, and/or the like.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Similarly, "or" means "and/or" herein, unless explicitly stated otherwise. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. Depending on the context, an "item" or a "good" may generally refer to a physical or electronic object, such as a physical or electronic document, a physical or electronic picture, etc., and a "service" may refer to a set of actions provided by an individual or organization for, or on behalf of, another individual or organization, such as a cleaning service, a transportation service, etc. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," "module," or the like, and generally encompasses software that is configured to interact with, modify, override, supplement, or operate in conjunction with other software.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, a machine learning model may be trained to receive input of an item or service placed into a virtual container (e.g., virtual shopping cart) on a web browser or application. Based on this, the machine learning model may identify characteristics of the item and/or service and may identify alternative items and/or services that satisfy one or more objectives for the individual based on the characteristics. For example, the machine learning model may identify alternative items or services that are similar to the items or services in the virtual shopping cart but are less expensive (e.g., which may allow the user to save the difference in a transaction account) or may identify alternative items or services that that are the same price but might be of more interest to the user. In addition, the machine learning model may receive input from the user related to whether the alternative items or services presented are of interest to the user, and may retrain a machine learning model based on this information.

While several of the examples above involve items and/or services in a virtual container, it should be understood that techniques according to this disclosure may be adapted to any suitable type of user interface selection of an item or service. It should also be understood that the examples above are illustrative only. The techniques and technologies of this disclosure may be adapted to any suitable activity.

Presented below are various aspects of machine learning techniques that may be adapted to generate user input-responsive recommendations for alternative items and/or services. As will be discussed in more detail below, machine learning techniques adapted to evaluate data related to items and/or services in a virtual shopping cart, may include one or more aspects according to this disclosure, e.g., a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

Figure 1:
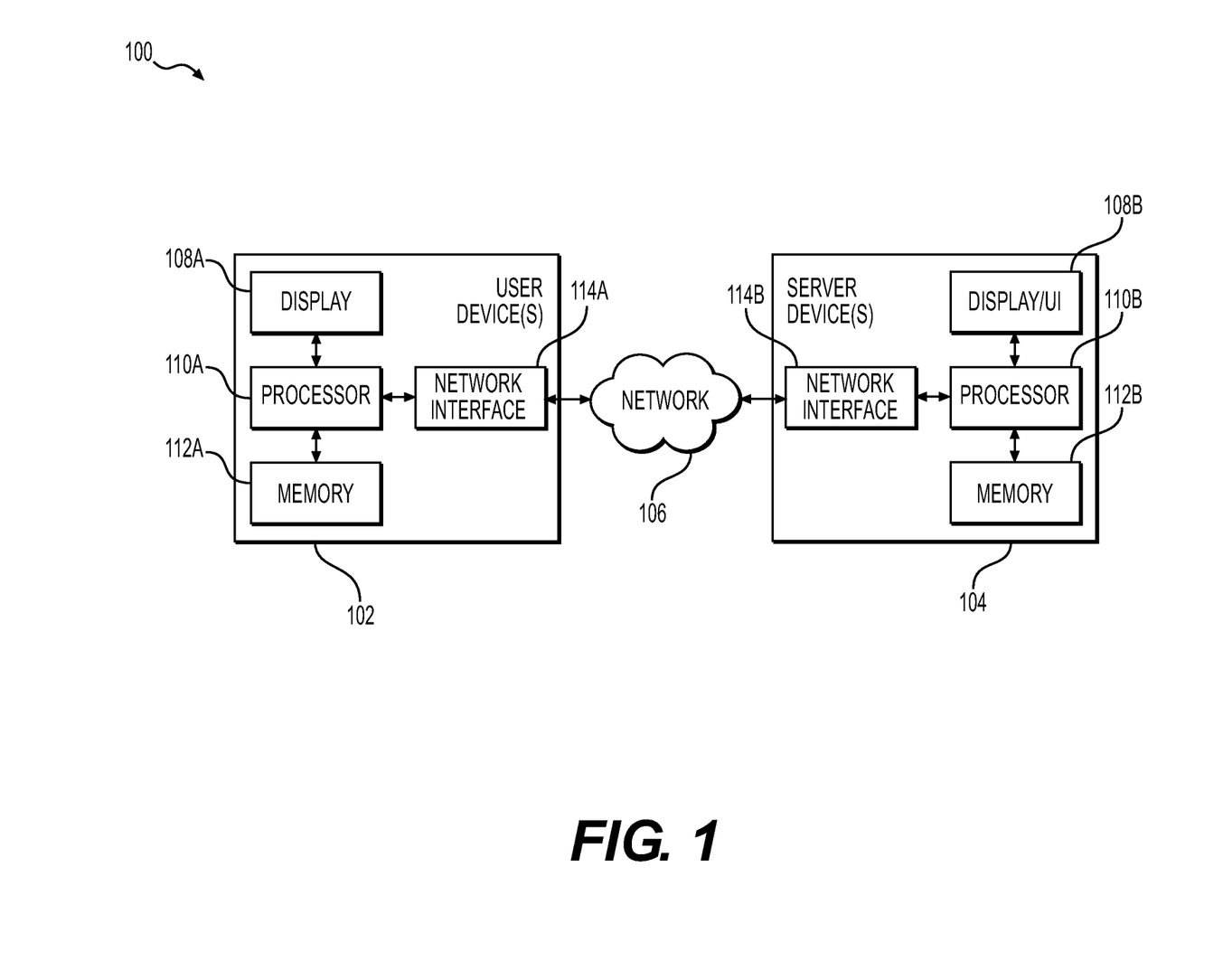
FIG. 1 depicts an exemplary environment for generating user input-responsive recommendations for alternative items and/or services, according to one or more embodiments.

FIG. 1 depicts an exemplary environment 100 for generating user input-responsive recommendations for alternative items and/or services, according to one or more embodiments. The environment 100 may include one or more user devices 102, one or more server devices 104, and a network 106. Although FIG. 1 depicts a single user device 102, server device 104, and network 106, the embodiments described herein are applicable to environments 100 that include two or more user devices 102, server devices 104, and/or networks 106 in any suitable arrangement.

The user device 102 may include a display 108A, a processor 110A, a memory 112A, and/or a network interface 114A. The user device 102 may be a mobile device, such as a smartphone, a cell phone, a tablet, a laptop computer, etc., a desktop computer, and/or the like. The user device 102 may execute, by the processor 110A, one or more instructions stored in the memory 112A to, e.g., generate recommendations for alternative items or services, or train and/or use one or more machine learning models to generate recommendations for alternative items and/or services, as described elsewhere herein. One or more components of the user device 102 may generate, or may cause to be generated, one or more graphic user interfaces (GUIs) based on instructions/information stored in the memory 112A, instructions/information received from the server device 104, and/or the like and may cause the GUIs to be displayed via the display 108A. The GUIs may be, e.g., mobile application interfaces or browser user interfaces and may include text, input text boxes, selection controls, and/or the like. The display 108A may include a touch screen or a display with other input systems (e.g., a mouse, keyboard, etc.) for an operator of the user device 102 to control the functions of the user device 102. The network interface 114A may be a transmission control protocol/Internet protocol (TCP/IP) network interface, or another type of wired or wireless communication interface, for Ethernet or wireless communications with the server device 104 via the network 106.

The server device 104 may include a display 108B, a processor 110B, a memory 112B, and/or a network interface 114B. The server device 104 may be a computer, system of computers (e.g., rack server(s)), or a cloud service computer system (e.g., in a data center). The server device 104 may execute, by the processor 110B, one or more instructions stored in the memory 112B to, e.g., generate user input—responsive recommendations for alternative items and/or services, or train and/or use one or more machine learning models to generate the user input-responsive recommendations for alternative items and/or services, as described elsewhere herein. One or more components of the server device 104 may generate, or may cause to be generated, one or more graphic user interfaces (GUIs) based on instructions/information stored in the memory 1126, instructions/information received from the user device 102, and/or the like and may cause the GUIs to be displayed via the display 108B.

The network 106 may include one or more wired and/or wireless networks, such as the Internet, an intranet, a wide area network ("WAN"), a local area network ("LAN"), a personal area network ("PAN"), a cellular network (e.g., a 3G network, a 4G network, a 5G network, etc.) or the like. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WNW" or called "the Web"). A "webpage" generally encompasses a location, data store, or the like that is, e.g., hosted and/or operated by a computer system so as to be accessible online, and that may include data configured to cause a program such as a web browser to perform operations such as send, receive, or process data, generate a visual display and/or an interactive interface, or the like. The user device 102 and the server device 104 may be connected via the network 106, using one or more standard communication protocols. The user device 102 and the server device 104 may transmit and receive messages from each other across the network 106, as discussed in more detail below.

As discussed in further detail below, the one or more components of exemplary environment 100 may process data from one or more user devices 102 and/or one or more server devices 104. Additionally, or alternatively, and as discussed in further detail below, the one or more components of exemplary environment 100 may generate, store, train and/or use a machine-learning model for generating user input-responsive recommendations for alternative items and/or services. The exemplary environment 100 or one of its components may include or be in operable communication with a machine-learning model and/or instructions associated with the machine-learning model, e.g., instructions for generating a machine-learning model, training the machine-learning model, using the machine-learning model, etc. The exemplary environment 100 or one of its components may include instructions for retrieving data, adjusting data, e.g., based on the output of the machine-learning model, and/or operating a display to output data, e.g., as adjusted based on the machine-learning model. The exemplary environment 100 or one of its components may include, provide, obtain, and/or generate training data.

In some embodiments, a system or device other than the components shown in the exemplary environment 100 may be used to generate and/or train the machine-learning model. For example, such a system may include instructions for generating and/or obtaining the machine-learning model, the training data and ground truth, and/or instructions for training the machine-learning model. A resulting trained-machine-learning model may then be provided to the exemplary environment 100 or one of its components and, for example, stored in the memory 112A and/or 112B.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Certain embodiments may utilize, for training a machine learning model, unsupervised learning where, e.g., the sample of training data may not include pre-assigned labels or scores to aid the learning process or may utilize semi-supervised learning where a combination of training data with pre-assigned labels or scores and training data without pre-assigned labels or scores is used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., may be used to compare the output of the trained model with the ground truth for that portion of the training data to evaluate an accuracy of the trained model. The training of the machine-learning model may be configured to cause the machine-learning model to learn associations between training data (e.g., computing system data) and ground truth data, such that the trained machine-learning model is configured to determine an output in response to the input data based on the learned associations.

In various embodiments, the variables of a machine-learning model may be interrelated in any suitable arrangement in order to generate the output. For example, in some embodiments, the machine-learning model may include an architecture that is configured to determine a relevance score for data from a computing system based on values (e.g., historical or predicted values) for one or more target variables for the data (e.g., determine a score that indicates a similarity of an alternative item and/or service to an item and/or service in a virtual container, a likelihood of an alternative items and/or service being of interest to an individual, etc.). For example, the machine-learning model may include one or more neural networks configured to identify features in the data, and may include further architecture, e.g., a connected layer, neural network, etc., configured to determine a relationship between the identified features in order to determine a location in the data. In certain embodiments, the machine learning model may include a single node for classification, as described elsewhere herein.

In some instances, different samples of training data and/or input data may not be independent. Thus, in some embodiments, the machine-learning model may be configured to account for and/or determine relationships between multiple samples.

For example, in some embodiments, the machine-learning model of certain embodiments may include a Recurrent Neural Network ("RNN"). Generally, RNNs are a class of feed-forward neural networks that may be well adapted to processing a sequence of inputs. In some embodiments, the machine-learning model may include a Long Shor Term Memory ("LSTM") model and/or Sequence to Sequence ("Seq2Seq") model. An LSTM model may be configured to generate an output from a sample that takes at least some previous samples and/or outputs into account.

Although depicted as separate components in FIG. 1, it should be understood that a component or portion of a component in the exemplary environment 100 may, in some embodiments, be integrated with or incorporated into one or more other components. For example, the server device 104 may be integrated in a data storage system. In some embodiments, operations or aspects of one or more of the components discussed above may be distributed amongst one or more other components. Any suitable arrangement and/or integration of the various systems and devices of the exemplary environment 100 may be used.

Further aspects of user input-responsive recommendations for alternative items and/or services or of the machine-learning model and/or how it may be trained or used to generate the recommendations are discussed in further detail below. In the following disclosure, various acts may be described as performed or executed by a component from FIG. 1, such as the user device 102, the server device 104, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

The example environment 100 described above is provided merely as an example, and may include additional, fewer, different, or differently arranged aspects than depicted in FIG. 1.

Figure 2:
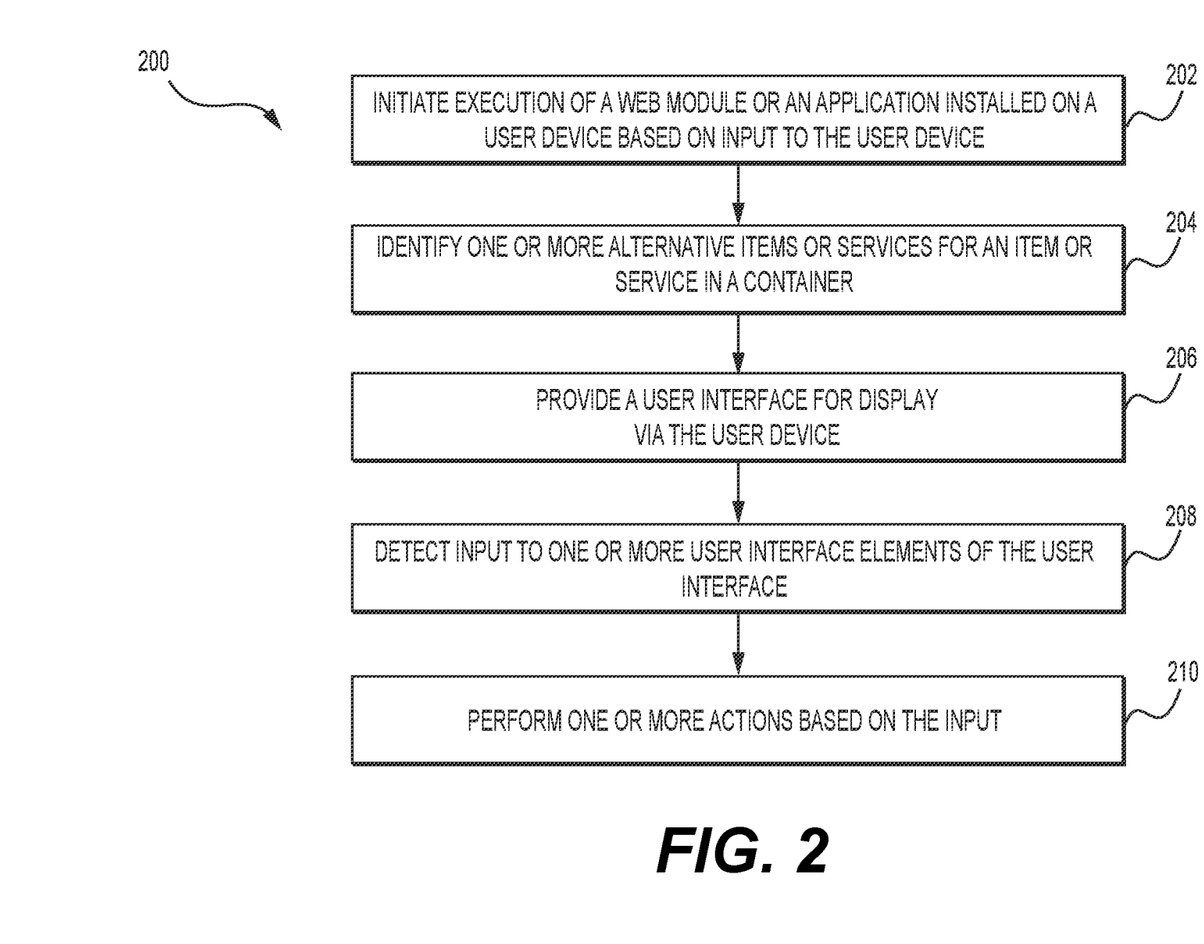
FIG. 2 depicts a flowchart of an exemplary method of user input-responsive recommendations for alternative items and/or services, according to one or more embodiments.

FIG. 2 depicts a flowchart of an exemplary method 200 of user input-responsive recommendations for alternative items and/or services, according to one or more embodiments. In certain embodiments, a user device 102 may perform the method 200 (e.g., a browser extension or an application installed on the user device 102 may perform the method 200). In certain embodiments, a server device 104 may perform one or more of the steps of the method 200.

At step 202, the method 200 may include initiating execution of a web module or an application installed on a user device based on input to the user device. For example, the user device 102 may initiate execution of a web module (e.g., a browser extension installed on a web browser installed on the user device 102) or an application (e.g., a shopping application, a virtual assistant, etc.) installed on the user device 102. The user input to the user device 102 may include a user selection of the application (e.g., a shopping application), opening of the web browser, navigating the web browser to a uniform resource locator (URL) for a particular type of web site (e.g., a shopping web site), and/or the like. Additionally, or alternatively, the input may include selection of a user interface element or input to cause the application or a web browser to perform an action. For example, when using a shopping application or browsing a shopping web site, the user device 102 may initiate execution of the web module or a virtual assistant based on the user selecting an item or service and placing the item or service in a virtual container (e.g., a virtual shopping cart). In certain embodiments, the user device 102 may initiate the execution of the web module or the application automatically based on the user input, after prompting the user to confirm whether to initiate the execution and receiving confirmation to initiate the execution, and/or the like.

As a specific example of the step 202, the user device 102 may detect that the user of the user device 102 has placed an item or a service into a virtual shopping cart on a web page, and may initiate execution of a browser extension based on detecting the user placement into the virtual shopping cart. As another specific example, the user may open a shopping application installed on the user device 102 and may initiate execution of a virtual assistant associated with the shopping application based on detecting opening of the shopping application.

The method 200 may include, at step 204, identifying one or more alternative items or services for an item or service in a container. For example, the user device 102 (e.g., the web module or the application installed on the user device 102) may identify one or more alternative items or services for an item or service in a container. The user device 102 may identify the one or more alternative items or services based on the item or service being added to the container (e.g., automatically after the user adds the item or service to the container), based on a command from a user to a user interface to identify the one or more alternative items or services, and/or the like.

The one or more alternative items or services may have similar characteristics to the item or service in the container. For example, if the item in the virtual shopping cart is a pair of running shoes, the one or more alternative items may include one or more other pairs of running shoes that are the same color as the pair of running shoes, that are the same brand as the pair of running shoes, and/or the like. Additionally, or alternatively, the one or more alternative items or services may be associated with a same or different cost as the item or service in the container. Continuing with the example related to the pair of running shoes, the one or more alternative items or services may include one or more other less expensive pairs of shoes, one or more other pairs of shoes at the same price, and/or the like. Additionally, or alternatively, the one or more alternative items or services may be different types of items or services in which the user may be more interested. Continuing with the example related to the pair of running shoes, the one more alternative items or services may include an electronics device or a trip to a destination. In this example, the user device 102 may recommend the different types of items or services as alternatives based on, e.g., processing transaction information and determining that the user has purchased the type of item or service in the container within a threshold amount of time.

The container may include a virtual container (or virtual representation of a container) with which information related to the item or service may be associated. For example, the container may include a virtual shopping cart, a virtual basket, a checkout web page, and/or another similar type of software or user interface element.

The user device 102 may identify the one or more alternative items or services using one or more machine learning models. For example, the one or more machine learning models may include different machine learning models for different types of items or services, for different users, and/or the like. Continuing with the previous example, the user device 102 may use a first model for a first item or service and a first user, a second model for a second item or service and the first user, and/or the like.

The one or more machine learning models may be trained to receive input data, process the input data, and output a score. The input data may include images, text, metadata, and/or the like related to the item or service in the container. For example, the user device 102 may gather the input data using computer vision, natural language or text processing, and/or the like to process a user interface or a web page that contains information related to the item or service, may request the input data from a database that stores information for various items or services, and/or the like. The one or more machine learning models may process the input data to identify characteristics of the item or service. For example, the one or more machine learning models may process the input data to identify a type (e.g., shoes, trip, book, etc.), price range (e.g., low cost, expensive, etc.), color, features (e.g., the weight, material, stability, etc. of a pair of running shoes), and/or the like of the item or service.

The one or more machine learning models may determine and output a score for one or more alternative items or services, and may identify the alternative items or services based on the scores. For example, the one or more machine learning models may compare the characteristics of the item or service in the container to characteristics of one or more other items or services. In this example, the one or more machine learning models may determine and output a score that indicates a similarity between the characteristics of the item or service in the container and the one or more other items or services.

Additionally, or alternatively, and as another example, the one or more machine learning models may determine a score for one or more alternative items or services based on a characteristic of a user or an account associated with the user. For example, the one or more machine learning models may process data related to preferences, prior transaction history, a type of an account (e.g., savings account, checking account, business account, personal account, etc.), and/or the like of a user and may determine a score based on an extent to which the characteristics of the data match the characteristics of the one or more alternative items or services (e.g., a book may match well as an alternative item to a pair of running shoes for a user that buys a certain number of books every month, a less expensive item may match an individual that is going to use a savings account to pay for item, etc.). In this way, the score based on the characteristic of the user may indicate a likelihood that the user might be interested in the alternative item or service. The data related to the characteristics of the user may be gathered from a profile on an application, from a database stored on a server device 104, and/or the like.

Additionally, or alternatively, and as another example, the one or more machine learning models may determine a score for one or more alternative items or services based on whether characteristics of the one or more alternative items or services satisfy one or more objectives. Continuing with this example, the one or more objectives may include prioritizing cost savings, prioritizing a likelihood of interest to the user, and/or the like and the one or more machine learning models may score one or more alternative items or services based on the extent to which the one or more alternative items or services satisfy the one or more objectives. For example, the one or more machine learning models may score two alternative pairs of shoes that are similar to a pair of shoes in the container differently based on which pair may save the user more money, which pair the user is more likely to be interested in, and/or the like.

The user device 102 may identify the one or more alternative items or services based on the determined scores. For example, the user device 102 may rank or order (for display) possible alternative items or services by score and may select items or services that have a threshold score, may select the N highest ranked items or services, and/or the like as the one or more alternative items or services. In other embodiments, the user device 102 may determine an order in which to display the one or more alternative items or services based on one or more criteria (e.g., preferences set by a user), the item or service (e.g., alternative items or services that the user is more likely to be interested in based on the item or service in the container may be ranked higher), one or more characteristics of the item or service or one or more characteristics for the one or more alternative items or services (e.g., alternative items or services that are similar to the item or service in the container may be ranked higher), one or more characteristics for an account, etc.

In connection with the step 204, the user device 102 may determine information related to an effect of the item or service, or of the one or more alternative items or services, on an account (e.g., a financial account). For example, the effect may include an amount subtracted from the account (alone or in aggregate with one or more other amounts during a time period), an impact of the amount for the item or service on a financial objective of the user (e.g., a savings goal), and/or the like. The user device 102 may determine financial recommendations based on the effect to the financial account. The financial recommendations may include purchasing a less expensive item or service based on the user's spending exceeding a threshold in a time period, based on the amount saved with the less expensive item or service being sufficient to pay for a bill that the user has to pay, based on a financial objective of the user (e.g., to save a certain amount within a time period), and/or the like. In this way, certain embodiments may provide financial coaching to the user, may help to improve a financial literacy of the user, and/or the like.

The method 200 may include, at step 206, providing a user interface for display via the user device. For example, the user device 102 may provide a user interface for display via the user device 102. The user device 102 may provide the user interface for display after identifying the one or more alternative items or services, based on the user selecting a user interface element that causes the user interface to be displayed (e.g., selecting an icon for a virtual assistant), and/or the like.

The user interface may include first information related to the item or service in the container. For example, the first information may include images, text, metadata, and/or the like related to the item or service in the container. Continuing with the previous example, the first information may have been gathered using computer vision, natural language processing (or other text processing), and/or the like on a web page, from a data store (e.g., a database), or via an application programming interface (API) associated with a web site. The user interface may include second information related to the one or more alternative items or services identified at step 204. For example, the second information may include images, text, metadata, and/or the like gathered from a database that stores information for various possible alternative items or services.

In certain embodiments, the first information and the second information may be selected for display on the user interface based on the identification of the one or more alternative items or services. For example, if the one or more alternative items or services are identified based on the similarity of their characteristics to the characteristics of the item or service in the container, the first information and/or the second information may include the characteristics of the item or service or the alternative items or services. As a specific example, if the item in the container is a pair of black shoes and the alternative items are other pairs of shoes that were identified because they are less expensive than the pair of black shoes, the first information and the second information may include information related to the price, savings, etc. for the pair of black shoes or the other pairs of black shoes.

The user interface may include different portions and the first information and the second information may be displayed in different portions. For example, the user interface may include a first portion and a second portion where the first information is displayed in the first portion and the second information is displayed in the second portion. One portion may be displayed above another portion, one portion next to another portion, one portion overlain on another portion, and/or the like.

The user interface may include one or more user interface elements overlain on the first portion or the second portion. For example, the one or more user interface elements may include buttons, text boxes, drop down menus, and/or the like for controlling the operations of the user interface, for inputting information related to the user interface to the user device 102, and/or the like. As specific examples, the one or more user interface elements may include one or more buttons for the user to indicate an interest in an alternative item or service, to replace an item or service in a container with an alternative item or service, to scroll through second information for different alternative items or services, to check out the item or service and/or an alternative item or service, to access a virtual assistant, and/or the like.

In certain embodiments, the user device 102 may include information related to a reason for including items or services in the one or more alternative items or services. For example, the information may indicate that an alternative item or service was included in the one or more alternative items or services because it is less expensive, satisfies an objective related to a financial account, may be of interest to the user, and/or the like.

In some embodiments, the user device 102 may provide a dashboard for display. For example, the dashboard may include the first information and/or the second information described above, information related to a financial account of the user (e.g., a balance, a ledger of transactions, spending amounts over time, etc.), a financial recommendation for the financial account, and/or the like. In this way, certain embodiments may provide a user with a centralized view of an account and/or purchases related to the account and their effects on the account.

The method 200 may include, at step 208, detecting input to one or more user interface elements of the user interface. For example, the user device 102 may detect input to one or more user interface elements of the user interface after providing the user interface for display.

As one example, the input may include a command to cycle through display of the one or more alternative items or services. For example, the user may select an arrow icon or a "next" button to scroll the user interface from second information for a first item or service to second information for a second item or service. Additionally, or alternatively, and as another example, the input may include a selection of at least one of the one or more alternative items or services. For example, the user of the user device 102 may select one or more of the alternative items or services to add to the container with the item or service, to save for later purchasing, to replace the item or service in the container, and/or the like. Additionally, or alternatively, the input may include an indication of a preference for the one or more alternative items or services. For example, the user of the user device 102 may make a selection of user interface elements on the user interface to indicate that they are interested or uninterested in an alternative item or service, that the alternative item or service is a match (or not a match) for the item or service in the container, and/or the like. The user device 102 may use the input of the preference to modify the one or more alternative items or services, to update training for the one or more machine learning models, and/or the like, as described in more detail below.

In some embodiments, the input may include text, a menu selection, etc. that indicates a reason why the user placed the item or service in the container. For example, the reason may include that the user needs to replace a previously purchased item or service, wants to upgrade an item or service, just has an interest in purchasing the item or service, and/or the like, and the user device 102 may use this input to re-train the one or more machine learning models, to modify items or services included in the one or more alternative items or services, and/or the like. As a specific example, the user device 102 may re-train the one or more machine learning models to output a lower score for alternative items or services that are less expensive than the item or service in the container based on the user indicating that they are purchasing the item or service as an upgrade to a previously purchased item or service. Additionally, or alternatively, and as another specific example, the user device 102 may remove less expensive alternative items or services from the one or more alternative items or services based on the user indicating that they are purchasing the item or service as an upgrade to a previously purchased item or service.

At step 210, the method 200 may include performing one or more actions based on the input. For example, the user device 102 may perform one or more actions based on the input. The user device 102 may perform the one or more actions automatically after detecting the input, after prompting the user to confirm to the user device 102 to perform an action, and/or the like.

As one example of an action, the user device 102 may update the one or more identified alternative items or services based on the input. For example, the user device 102 may remove an alternative item or service from the one or more alternative items or services, may add an alternative item or service to the one or more alternative items or services, and/or the like.

Additionally, or alternatively, and as another example of an action, the user device 102 may provide a detailed view of the second information for display. For example, the user device 102 may display some second information for an alternative item or service and a "view additional information" button for the alternative item or service, selection of which may provide additional second information for display.

Additionally, or alternatively, and as another example of an action, the user device 102 may add a selected alternative item or service to the container. Additionally, or alternatively, and as another example of an action, the user device 102 may replace an item or service in the container with a selected alternative item or service. For example, the user may input a selection of an alternative item or service and a selection of the item or service in the container to be replaced by the selected alternative item or service, and the user device 102 may replace the selected item or service in the container with the selected alternative item or service. Additionally, or alternatively, and as another example of an action, the user device 102 may add the alternative item or service to another container (e.g., a "saved" list to save the selected item or service, a "wish" list shared with one or more other individuals, etc.) based on the user selecting the alternative item or service and selecting a user interface element to add the alternative item or service to the other container.

Additionally, or alternatively, as another example of an action, the user device 102 may update training of the one or more machine learning models. For example, the user device 102 may re-train the one or more machine learning models to output a lower or higher score for certain alternative items or services based on the preference indicated by the user. As one specific example, the user input may indicate a lack of a preference (or negative preference) for an alternative item or service, and the user device 102 may re-train the one or more machine learning models to output a lower score for the alternative item or service (or other similar alternative items or services) for the user. As another specific example, the user input may indicate a positive preference for the alternative item or service, and the user device 102 may re-train the one or more machine learning models to output a higher score for the alternative item or service (or other similar alternative items or services). As another example, the user input may indicate to the user device 102 that the user is possibly interested in the one or more alternative items or services or to request that the user device 102 remind the user about the one or more alternative items or services at a later time.

Additionally, or alternatively, and as another example of an action, the user device 102 may receive a command to complete a purchase of the item or service in the container or an alternative item or service in the container, and may send one or more commands to a server device 104 (e.g., associated with a merchant) to complete the purchase. Additionally, or alternatively, and as another example of an action, the user device 102 may send one or more commands to a server device 104 (e.g., that hosts a financial account) related to the purchase. For example, and as described elsewhere herein, the user interface may include information related to effects of purchasing items or service, or alternative items or services, such as in a financial coaching context. In this case, purchase of an alternative item or service may be combined with, e.g., placing the amount saved by purchasing the alternative item or service into a savings account, and the user device 102 may send a command to a server device 104 hosting the savings account to add the amount from, e.g., a checking account to the savings account.

The example method 200 described above is provided merely as an example, and may include additional, fewer, different, or differently arranged aspects than depicted in FIG. 2.

Figure 3:
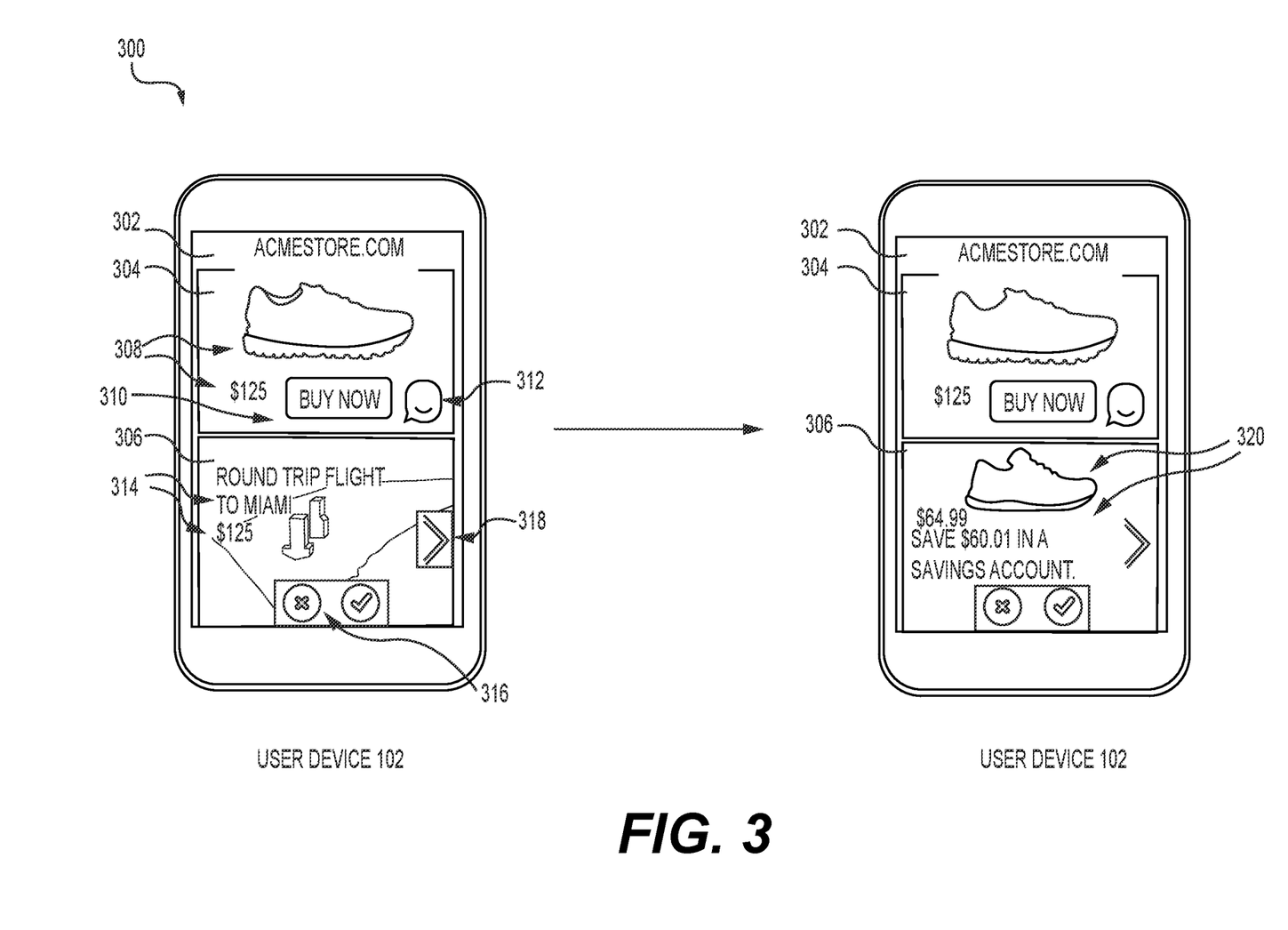
FIG. 3 depicts an example of user interface operations for user input-responsive recommendations for alternative items and/or services, according to one or more embodiments.

FIG. 3 depicts an example 300 of user interface operations for user input-responsive recommendations for alternative items and/or services, according to one or more embodiments. The example 300 may illustrate operations of a user interface that displays first information for an item or service in a container and second information for one or more alternative items or services, where the user interface additionally includes various user interface elements.

As illustrated in FIG. 3, the example 300 includes a user device 102. The user device 102 may display a user interface 302 (e.g., a user interface similar to that described above in connection with step 206 of the method 200 of FIG. 2). As further illustrated, the user interface 302 may include a first portion 304 and a second portion 306, similar to that described elsewhere herein. In the first portion 304, the user interface 302 may include first information at 308 related to an item in a virtual shopping cart, such as an image for the item and a price for the item. The first portion 304 may further include one or more user interface elements. For example, the first portion 304 may include a "Buy Now" button at 310, selection of which may cause the item in the virtual shopping cart to be purchased (e.g., by causing the user device 102 to send a command to a server device 104 to complete the purchase), as described elsewhere herein. Additionally, or alternatively, and as another example, the first portion 304 may include a selectable icon at 312, selection of which may initiate a virtual assistant associated with an application or a web page.

The second portion 306 may include second information at 314 related to the one or more alternative items or services. For example, the second information at 314 may include text that identifies or describes an alternative item or service and a price for the alternative item or service. As illustrated in FIG. 3, the user interface 302 may display second information at 314 for just one alternative item or service; however, other embodiments may include displaying second information at 314 for multiple items or services. The second portion 306 may include one or more user interface elements. For example, the second portion 306 may include a set of buttons 316, such as an "X" button to decline an alternative item or service or to indicate a negative preference for the item or service or a checkmark button to accept an alternative item or service or to indicate a positive preference for the item or service, as described elsewhere herein. The user device 102 may then perform actions described herein based on the indicated preference. As another example, the one or more user interface elements may include a control 318, selection of which may cause second information for another alternative item or service to be displayed in a scrolling manner.

Assume for example, that the user has selected the control 318 to scroll from the second information displayed at 314 to second information for another alternative item or service displayed at 320. In this example, the user interface 302 may display the second information at 320 for a different alternative item. For example, the second information at 320 may include an image of the alternative item, a price of the alternative item, and text related to options for saving the difference in price between the item in the virtual shopping cart and the alternative item in a savings account. As described elsewhere herein, selection of the alternative item may cause the user device 102 to send a command to a server device 104 to purchase the alternative item, to save the difference in amounts in the savings account, and/or the like.

The example 300 described above is provided merely as an example, and may include additional, fewer, different, or differently arranged aspects than depicted in FIG. 3.

In this way, certain embodiments may process data related to an item or service in a container to understand the characteristics of the item or service, preferences of the user, and/or prior purchases of the user. Certain embodiments may then recommend alternative items or services, e.g., that satisfy an objective for a financial account. This may help to reduce or eliminate a need for the user to search for such alternative items or purchases at a later time, which may conserve computing resources of computers, etc. that would otherwise be used for those purposes. In addition, certain embodiments may provide a centralized system for purchasing the alternative items or services, which may increase an efficiency of these activities and/or increase a security of these activities, e.g., by reducing or eliminating a need for the user to provide transaction account/card information to various different computing systems. Furthermore, certain embodiments may improve a financial literacy of customers through identification of alternative items or services that may satisfy a financial objective of the customer.

Figure 4:
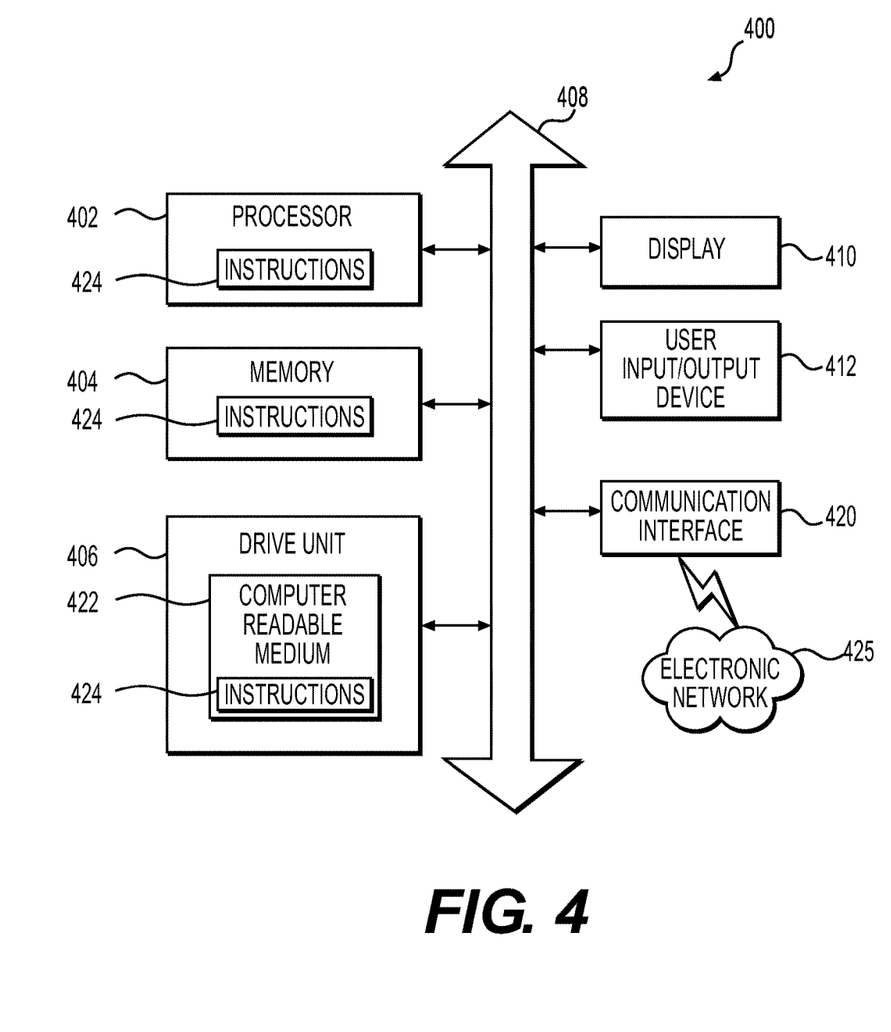
FIG. 4 depicts an example of a computing device, according to one or more embodiments.

FIG. 4 depicts an example of a computer 400, according to certain embodiments. FIG. 4 is a simplified functional block diagram of a computer 400 that may be configured as a device for executing processes or operations depicted in, or described with respect to, FIGS. 1-3, according to exemplary embodiments of the present disclosure. For example, the computer 400 may be configured as the user device 102, server device 104, and/or another device according to exemplary embodiments of this disclosure. In various embodiments, any of the systems herein may be a computer 400 (or include multiple computers 400) including, e.g., a data communication interface 420 for packet data communication. The computer 400 may communicate with one or more other computers 400 using the electronic network 425. The network interfaces 114A, B in FIG. 1 may include one or more communication interfaces 420. The electronic network 425 may include a wired or wireless network similar to the network 106 depicted in FIG. 1.

The computer 400 also may include a central processing unit ("CPU"), in the form of one or more processors 402, for executing program instructions 424. The processors 110A, B depicted in FIG. 1 may include one or more processors 402. The computer 400 may include an internal communication bus 408, and a drive unit 406 (such as read-only memory (ROM), hard disk drive (HDD), solid-state disk drive (SDD), etc.) that may store data on a computer readable medium 422, although the computer 400 may receive programming and data via network communications. The computer 400 may also have a memory 404 (such as random access memory (RAM)) storing instructions 424 for executing techniques presented herein, although the instructions 424 may be stored temporarily or permanently within other modules of the computer 400 (e.g., processor 402 and/or computer readable medium 422). The memories 112A, B depicted in FIG. 1 may include one or more memories 404. The computer 400 also may include user input and output ports 412 and/or a display 410 to connect with input and output devices such as keyboards, mice, touchscreens, monitors, displays, etc. The displays 108A, B may include one or more displays 410. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another, e.g., from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to processing data related to an item or service in a container, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to processing data related to an item or service using a machine learning model, any suitable activity may be used. In an exemplary embodiment, instead of or in addition to processing data related to an item or service in a container, certain embodiments include processing data related to any item or service, in a container or otherwise.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for processing items or services in a container, comprising:
    initiating execution of a web module or an application installed on a user device based on input to the user device;
    identifying one or more alternative items or services for an item or service in the container;
    providing a user interface for display via the user device, the user interface comprising:
        first information related to the item or the service in a first portion of the user interface,
        second information related to the one or more alternative items or services in a second portion of the user interface, and
        one or more user interface elements overlaying the first portion or the second portion;
    detecting input to the one or more user interface elements, the input comprising one or more of:
        a command to cycle through display of the one or more alternative items or services,
        a selection of at least one of the one or more alternative items or services, or
        an indication of a preference for the one or more alternative items or services;
    performing one or more actions based on the input;
    determining an effect of one or more of the item or service or the alternative item or service on a predetermined budgeting, savings, or spending objective associated with a financial account of a user associated with the user device, the effect including at least one characteristic of the financial account unassociated with the one or more of the item or service or the alternative item or service;
    determining a financial recommendation based on the effect; and causing the user interface to output the financial recommendation.

2. The computer-implemented method of claim 1, further comprising:
obtaining the first information related to the item or the service by accessing a data store or using text or image processing.

3. The computer-implemented method of claim 1, further comprising:
processing the first information, the second information, and third information related to the financial account using one or more machine learning models, wherein output from the processing comprises one or more first characteristics of the item or the service, one or more second characteristics of the one or more alternative items or services, or one or more third characteristics of the financial account; and
wherein the identifying of the one or more alternative items or services further comprises:
identifying the one or more alternative items or services based on the one or more first characteristics, the one or more second characteristics, or the one or more third characteristics.

4. The computer-implemented method of claim 1, wherein the providing of the user interface for display further comprises:
providing the user interface with at least one user interface element associated with a virtual assistant, wherein the at least one user interface element is configured to receive a command to activate the virtual assistant.

5. The computer-implemented method of claim 1, wherein the performing of the one or more actions further comprises:
updating the identifying of the one or more alternative items or services based on the input.

6. The computer-implemented method of claim 1, further comprising:
determining an order in which to display the one or more alternative items or services based on:
the item or the service,
one or more first characteristics for the item or the service,
one or more second characteristics for the one or more alternative items or service, or
one or more third characteristics for the financial account.

7. The computer-implemented method of claim 1, further comprising:
receiving the selection of the at least one of the one or more alternative items or services; and
providing a detailed view of the second information for display or replacing the item or service in the container based on receiving the selection.

8. The computer-implemented method of claim 1, wherein the performing of the one or more actions further comprises:
receiving, via the one or more user interface elements, an indication of a lack of the preference for the one or more alternative items or services; and
receiving, via the one or more user interface elements, a command to complete a purchase of the item or the service in the container.

9. The computer-implemented method of claim 1, wherein the performing of the one or more actions further comprises:
receiving the indication of the preference for the one or more alternative items or services; and
receiving, via the one or more user interface elements, a command to complete a purchase of the one or more alternative items or services.

10. The computer-implemented method of claim 1, wherein the providing of the one or more user interface elements further comprises:
providing information identifying an effect of the item or the service or of the one or more alternative items or services for display in association with the first information or the second information.

11. A user device, comprising:
at least one memory storing instructions; and
at least one processor executing the instructions to perform operations for processing items or services in a container, the operations including:
initiating execution of a web module or an application installed on the user device based on first input to the user device;
identifying one or more alternative items or services for an item or service in the container;
providing a user interface for display via the user device, the user interface comprising:
first information related to the item or the service,
second information related to the one or more alternative items or services, and
one or more user interface elements operable to one or more of:
cycle through display of the one or more alternative items or services,
select at least one of the one or more alternative items or services, or
indicate a preference for the one or more alternative items or services;
determining an effect of one or more of the item or service or the alternative item or service on a predetermined budgeting, savings, or spending objective associated with a financial account of a user associated with the user device, the effect including at least one characteristic of the financial account unassociated with the one or more of the item or service or the alternative item or service;
determining a financial recommendation based on the effect; and
causing the user interface to output the financial recommendation.

12. The user device of claim 11, wherein the operations further comprise:
obtaining the first information related to the item or the service by accessing a data store or using text or image processing.

13. The user device of claim 11, wherein the operations further comprise:
processing the first information, the second information, and third information related to the financial account using one or more machine learning models, wherein output from the processing comprises one or more first characteristics of the item or the service, one or more second characteristics of the one or more alternative items or services, or one or more third characteristics of the financial account; and
wherein the identifying of the one or more alternative items or services further comprises:

identifying the one or more alternative items or services based on the one or more first characteristics, the one or more second characteristics, or the one or more third characteristics.

14. The user device of claim 11, wherein the providing of the user interface for display further comprises:
providing the user interface with at least one user interface element associated with a virtual assistant, wherein the at least one user interface element is configured to receive a command to activate the virtual assistant.

15. The user device of claim 11, wherein the operations further comprise:
updating the identifying of the one or more alternative items or services based on input received via the user interface.

16. The user device of claim 11, wherein the operations further comprise:
determining an order in which to display the one or more alternative items or services based on:
the item or the service,
one or more first characteristics for the item or the service,
one or more second characteristics for the one or more alternative items or service, or
one or more third characteristics for the financial account.

17. The user device of claim 11, wherein the operations further comprise:
receiving the selection of the at least one of the one or more alternative items or services; and
providing a detailed view of the second information for display or replacing the item or service in the container based on receiving the selection.

18. The user device of claim 11, wherein the operations further comprise:
receiving, via the one or more user interface elements, an indication of a lack of the preference for the one or more alternative items or services; and
receiving, via the one or more user interface elements, a command to complete a purchase of the item or the service in the container.

19. The user device of claim 11, wherein the operations further comprise:
receiving the indication of the preference for the one or more alternative items or services; and
receiving, via the one or more user interface elements, a command to complete a purchase of the one or more alternative items or services.

20. A non-transitory computer-readable medium storing instructions that, when executed by a processor, cause the processor to perform a method for processing items or services in a container, the method comprising:
initiating execution of a web module or an application installed on a user device;
identifying one or more alternative items or services for an item or service in the ntainer, wherein the identifying of the one or more alternative items or services is performed via a trained machine-learning model;
providing a user interface for display via the user device, the user interface comprising:
first information related to the item or the service in a first portion of the user interface,
second information related to the one or more alternative items or services in a second portion of the user interface, and
one or more user interface elements overlaying the first portion or the second portion;
determining an effect of one or more of the item or service or the alternative item or service on a predetermined budgeting, savings, or spending objective associated with a financial account of a user associated with the user device, the effect including at least one characteristic of the financial account unassociated with the one or more of the item or service of the alternative item or service;
determining a financial recommendation based on the effect; and
causing the user interface to output the financial recommendation.

* * * * *